No. 885,169. PATENTED APR. 21, 1908.
W. H. MILLER.
PNEUMATIC BRAKE.
APPLICATION FILED SEPT. 19, 1907.

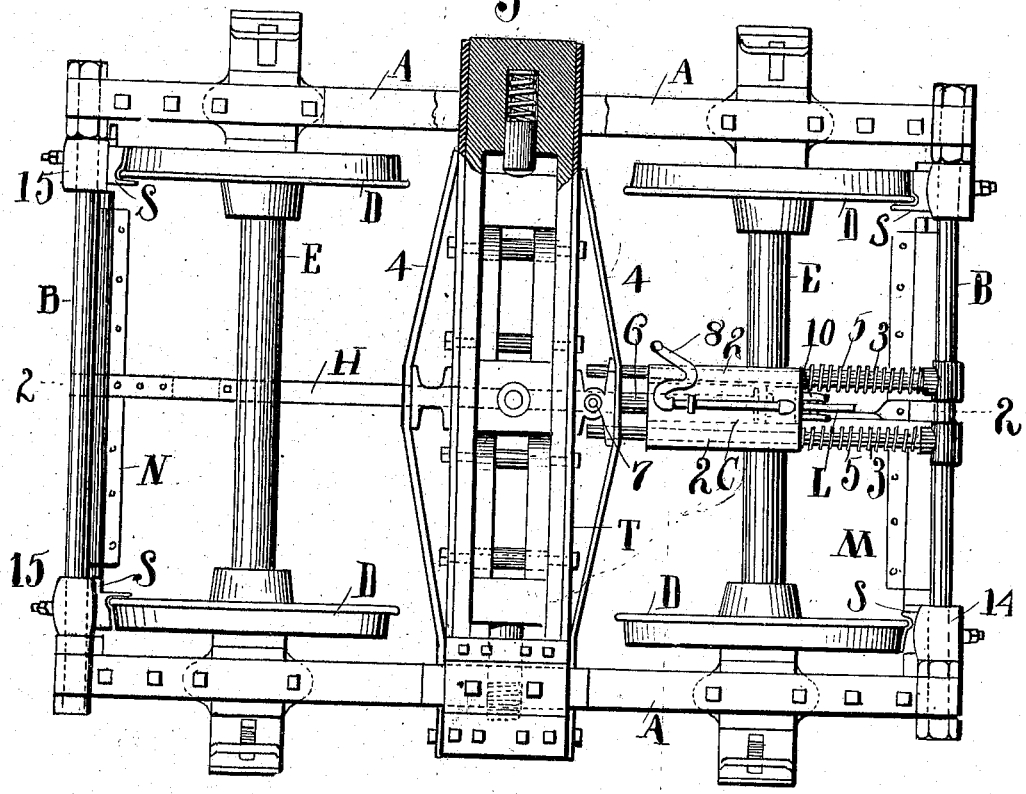

3 SHEETS—SHEET 2.

WITNESSES:
C. M. Fisher
F. C. Mussun

INVENTOR.
William H. Miller.
BY
Fisher & Moser
ATTORNEYS.

No. 885,169. PATENTED APR. 21, 1908.
W. H. MILLER.
PNEUMATIC BRAKE.
APPLICATION FILED SEPT. 19, 1907.

3 SHEETS—SHEET 3.

WITNESSES:
E. M. Fisher
F. C. Mussun

INVENTOR.
William H Miller
BY
Fisher & Mussun
ATTORNEYS.

UNITED STATES PATENT OFFICE.

WILLIAM H. MILLER, OF CLEVELAND, OHIO.

PNEUMATIC BRAKE.

No. 885,169.　　　Specification of Letters Patent.　　Patented April 21, 1908.

Application filed September 19, 1907. Serial No. 393,596.

*To all whom it may concern:*

Be it known that I, WILLIAM H. MILLER, a citizen of the United States, residing at Cleveland, in the county of Cuyahoga and State of Ohio, have invented certain new and useful Improvements in Pneumatic Brakes, and do declare that the following is a full, clear, and exact description of the invention, which will enable others skilled in the art to which it appertains to make and use the same.

My invention relates to improvements in pneumatic brakes for freight and other cars, and the invention consists in a brake mechanism adapted to be applied to and used in connection with a single truck, so that each truck shall have its own complete brake outfit and be independent of the other truck of the car in this respect, so that if for any reason one brake fails the other may work, all substantially as shown and described and particularly pointed out in the claims.

Figure 3:
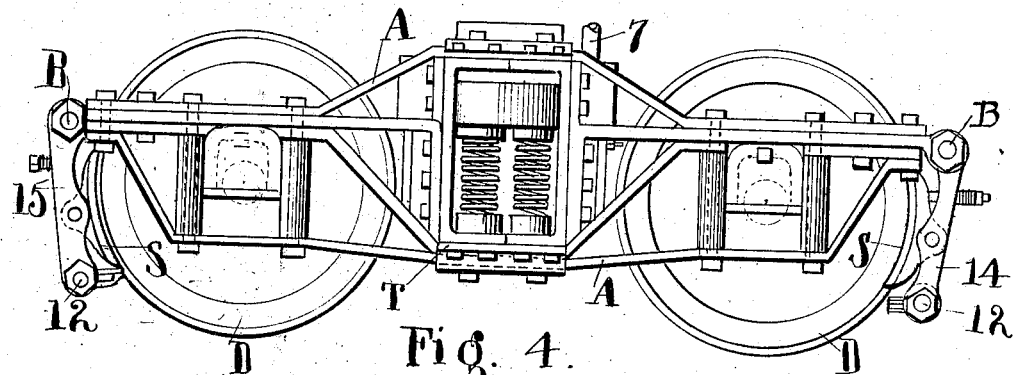
Figure 4:
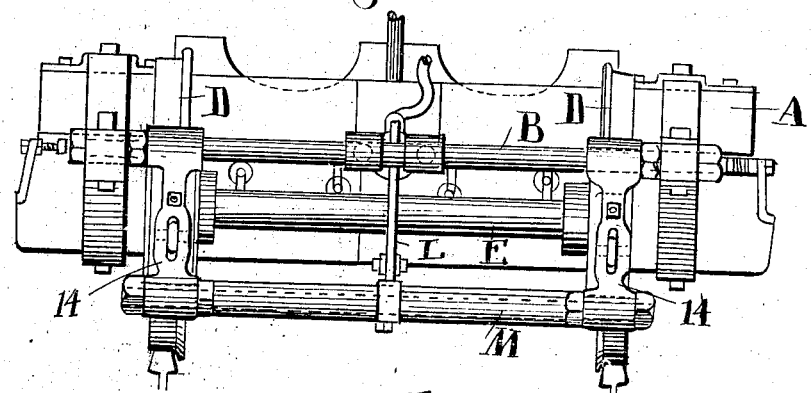
Figure 5:
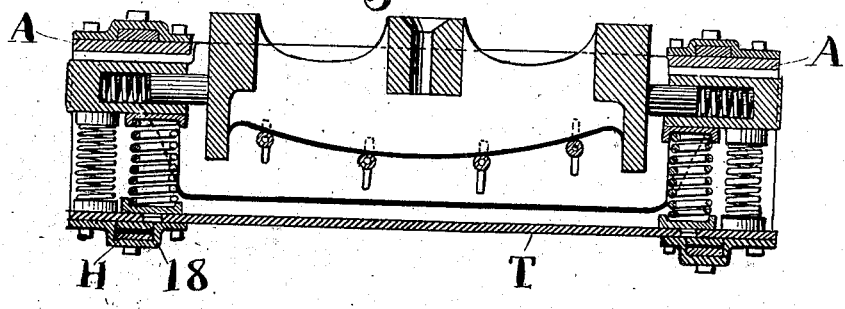
Figure 6:
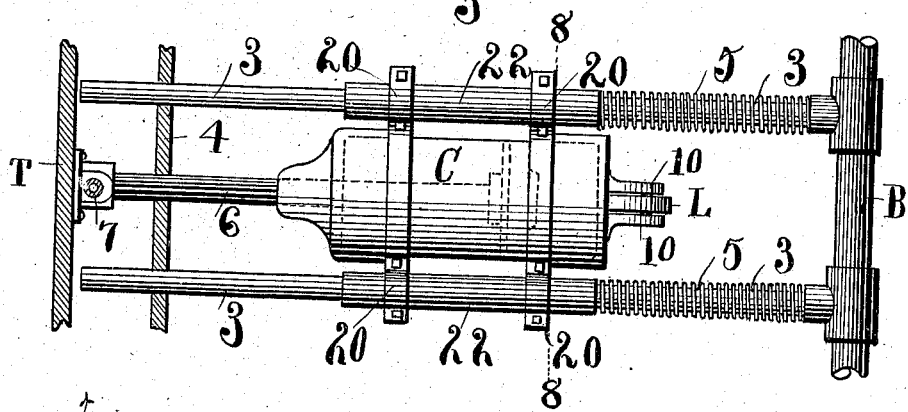
Figure 7:
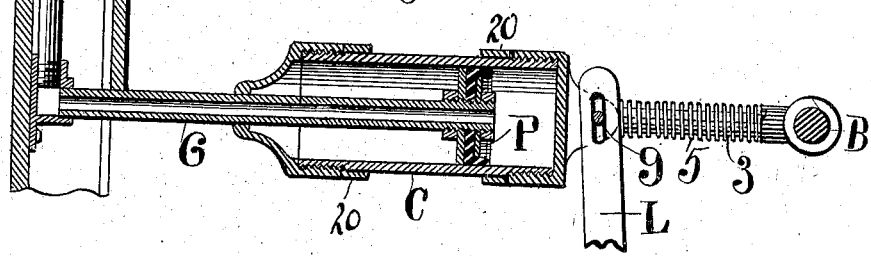
Figure 8:
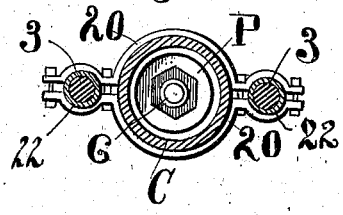

In the accompanying drawings, Figure 1 is a plan view of a truck comprising my improved brake mechanism in one of its forms, and Fig. 2 is a longitudinal sectional elevation of the truck on a line corresponding substantially to 2—2, Fig. 1. Fig. 3 is a side elevation of the truck shown in plan Fig. 1, and Fig. 4 is an end elevation thereof looking in from the right of Fig. 3. Fig. 5 is a cross section of the truck through the transom. Fig. 6 is a plan view of a modification particularly of the cylinder support and means for taking in air, and Fig. 7 is a longitudinal section of Fig. 6. Fig. 8 is a cross section on lines 8—8, Fig. 6.

The truck frame as a whole is composed of the sides A, the tie-bars B at the ends thereof and central rigid cross portions at and about transom T, and carrying wheels D are supported on axles E in suitable bearings in main frame A, the details of these portions of the structure not being material in this case.

C represents the pneumatic cylinder, which has integral tubular supports 2 at its sides, Fig. 1, slidable upon parallel supporting bars or rods —3—. Said rods are rigidly fixed at one end upon tie-bar B in any good mechanical way, and at the other end are made rigid with truss cross-braces —4— of the transom. Spiral springs —5— are engaged about said guide rods —3— and bear against said side supports or sleeves —2— of cylinder C in such manner as to normally press said cylinder inward toward the transom relatively as seen in Figs. 1 and 2, when brake shoes S are out of braking contact with wheels D. In other words the brake is open or out of braking relations in this position of the parts, Figs. 1 to 5 inclusive.

P represents a piston, which is rigidly supported in the cylinder by its own supporting tube 6. Said tube is rigidly engaged with the transom frame at its inner end and has open communication at said end with air or pressure supply pipe or tube —7—, leading back to supply pipe G. This represents one channel of pneumatic pressure for cylinder C, and the other channel is through tube and pipe connection —8—, which connects with pipe G as does pipe —7— and valves $g$ and $g'$ control flow through said connections. A cylinder may be provided with both these equipments or either alone, as in Fig. 7. In either case expansion comes between the front end of the cylinder and the piston, and the cylinder yields under such expansion or pressure against springs —5—, which are more or less compressed as this occurs. By taking in air through the piston the hose can be shorter than when taken through hose —8—, which has to make accommodation for back and forth movement of the cylinder.

The immediate brake mechanism comprises a primary actuating brake lever L, pivotally and more or less loosely engaged through a slot in its upper end on cross pin —9—, through ears —10— on the front end of cylinder C and extending downward therefrom to make connection with the respective draw-bars H and J. These bars engage with said lever L at different elevations from its lower end, bar J being connected with the immediate end of the lever and bar H higher up, and at its other end bar J engages with brake-beam M, and bar H engages with brake beam N at the opposite end of the truck. Said brake-beams are preferably built of suitable sheet metal folded and riveted which connect corresponding hangers —14— and —15—, the inner edges of said plates being flattened together and riveted and providing a flange for rigidly affixing the said draw-bars thereto. The said hangers are supported on the respective tie-bars B of the truck frame.

Draw bar H is preferably spliced at $h$ to enable the same to be drawn through keeper —18— under the transom in case of repairs. Both sets of brake shoe hangers are so arranged that they incline toward the wheels while braking, which causes them to swing open by gravity when pneumatic pressure is relaxed. In the arrangement shown the leverage upon the brakes from the cylinder is about three to one, and the leverage can be increased or diminished by adjustment of draw-bar H on lever L in perforations therein. Obviously, as shown, the brake-bars are caused to pull against each other through said lever as the cylinder is driven toward or into braking position, and no other fulcrum for said lever is required. When the pneumatic pressure is withdrawn cylinder C slides back to starting position under pressure of springs —5— and gravity of the hangers.

Respecting degrees of movement, when the brake-shoes are new cylinder C will not move more than about four inches, but as the shoes wear the difference will be made up by further movements of the cylinder say up to eight or ten inches. This precludes possible failure of the brakes to work because the cylinder can take up wear until the shoes are practically worn out. Furthermore, my brake-lever L has a direct draw on both brake-beams and all the shoes must therefore have exactly the same locking pressure and value. There cannot, therefore, be any such thing as brakes failing to work with this arrangement. It will be observed, also, that my brake-lever has a direct draw from the brake-beams, and having all wheels under equal brake pressure, it follows that if one wheel is locked to sliding all must slide, the track conditions being equal.

Figs. 6, 7 and 8 show a modification mainly of the support for cylinder C, said support consisting of two pairs of clamps —20—, engaged about cylinder C and fixed on sleeves or tubes —22— slidably engaged on rods —3—, serving the same purpose as side sleeves —2— in Fig. 1.

Compressed air is referred to herein as the preferred motive fluid for operating the brake, but any other and available fluid, gas or the like may be employed that will do the work. The valve outlets to the air intake to the cylinder are preferably of such reduced diameters that sudden and excessive inflow of air into the cylinder is prevented. The brake beams may be made in one or more pieces.

What I claim is:—

1. In car brakes, the car truck provided with a complete brake equipment comprising a cylinder mounted to slide lengthwise within limits, a stationary piston therein and means to supply air under pressure to the cylinder, and brake mechanism having initial actuating connection with said cylinder.

2. A brake equipment for cars adapted to use an expansive fluid and comprising a slidably mounted cylinder, a stationary piston therein, and an actuating lever connected with one end of said cylinder and draw-bars for the brake engaged with the other end of said lever.

3. A brake equipment for cars adapted to employ an expansive fluid, comprising a cylinder, a pair of parallel supports for the said cylinder at the sides thereof and springs on said supports pressing against the front end of said cylinder to hold the same in open relations, and a stationary piston projected into said cylinder.

4. In car brakes, a cylinder adapted to employ an expansive fluid and parallel supports upon which said cylinder is mounted, springs upon said supports to hold said cylinder in open relation, a fixed piston working in said cylinder, an actuating lever operatively connected with said cylinder at one end and draw-bars connected with the other end of said lever at different distances from the end thereof.

5. In brake mechanism for cars, a car truck, a brake equipment for said truck comprising a brake beam for each set of wheels, brake-bars connected with said beams at one end and an operating lever to which said bars are connected at their outer ends, in combination with a sliding cylinder having said lever engaged therewith, a stationary piston operating said cylinder and a pressure fluid connection for said cylinder.

6. A car brake having a pair of brake beams and brake bars connected therewith, a lever having said bars engaged therewith at different distances from its end, a cylinder to which said lever is engaged at its upper end, a fixed piston in said cylinder and fluid pressure connections through said piston into the cylinder.

7. The cylinder and the parallel supports therefor, springs to carry said cylinder back to normal position after use, fluid connections for said cylinder having flexible portions, a controlling lever engaged with said cylinder at its upper end, a set of brake-bars and separate draw-bars therefor engaged at different elevations with said lever, whereby one draw-bar is caused to pull against the other.

8. In car brakes, a cylinder slidably supported, a piston and a fixed tubular support therefor open through said piston, fluid pressure connections for said tubular support and a brake actuating lever engaged with said cylinder.

9. In car-brakes, a car truck and a brake equipment thereon comprising a single cylinder, supports at the sides thereof on which the cylinder is adapted to slide lengthwise, springs adapted to restore the cylinder to normal position after use, fluid connections to said cylinder and a fixed piston therein, in combination with a pair of hangers, brake-shoes on said hangers, brake beams, a lever engaged at its upper end with said cylinder and draw-bars fixed at different elevations on the lower end of said lever and connected respectively with the middle portions of said brake beams.

In testimony whereof I sign this specification in the presence of two witnesses.

WILLIAM H. MILLER.

Witnesses:
R. B. MOSER,
J. B. WEIGEL.